US009536404B2

(12) United States Patent
Glamuzina, Jr. et al.

(10) Patent No.: US 9,536,404 B2
(45) Date of Patent: Jan. 3, 2017

(54) BOTTLE FRAUD DETECTION SYSTEM AND METHOD

(71) Applicants: Steven M. Glamuzina, Jr., Williamsville, NY (US); Jeffrey C. Murphy, Lancaster, NY (US)

(72) Inventors: Steven M. Glamuzina, Jr., Williamsville, NY (US); Jeffrey C. Murphy, Lancaster, NY (US)

( * ) Notice: Subject to any disclaimer, the term of this patent is extended or adjusted under 35 U.S.C. 154(b) by 140 days.

(21) Appl. No.: 14/471,747

(22) Filed: Aug. 28, 2014

(65) Prior Publication Data
US 2016/0063830 A1    Mar. 3, 2016

(51) Int. Cl.
*G08B 13/14* (2006.01)
*G08B 13/24* (2006.01)

(52) U.S. Cl.
CPC ....... *G08B 13/2428* (2013.01); *G08B 13/2462* (2013.01)

(58) Field of Classification Search
None
See application file for complete search history.

(56) References Cited

U.S. PATENT DOCUMENTS

| 7,701,348 | B2 | 4/2010 | Kim | |
| 7,838,844 | B2* | 11/2010 | Wagner | G06K 7/10178 250/252.1 |
| 7,839,288 | B2* | 11/2010 | Wang | B65D 55/028 340/10.1 |
| 8,081,078 | B2* | 12/2011 | Arguin | G08B 13/2411 340/10.41 |
| 8,368,539 | B2 | 2/2013 | Adstedt | |
| 8,710,990 | B2* | 4/2014 | August | G06K 19/0717 235/375 |
| 8,912,888 | B2* | 12/2014 | Yoshida | G06K 19/07749 340/10.1 |
| 2007/0284333 | A1* | 12/2007 | Dunnigan | B65D 79/02 215/386 |
| 2008/0218348 | A1* | 9/2008 | August | G06K 19/0717 340/572.1 |
| 2008/0252463 | A1* | 10/2008 | Andrechak | G06K 19/04 340/572.7 |
| 2010/0007501 | A1* | 1/2010 | Yang | B01L 3/545 340/572.8 |

(Continued)

*Primary Examiner* — Julie Lieu
(74) *Attorney, Agent, or Firm* — Vincent G. LoTempio; Kloss, Stenger & LoTempio; David T. Stephenson (57) ABSTRACT

A bottle fraud system and method encapsulates a wireless communication tag into a bottle to ensure the authenticity of the bottle. The tag stores information about the bottle. The tag is physically integrated into a bottle stopper through encapsulation by multiple layers of a polymer film and a wax composition. The physical condition to the bottle stopper or the layers serves as an indication of whether tampering has occurred. The information in the tag is accessible through a reading device. The reading device communicates with a database that stores information about the bottle and analyzes the probability of fraud with an algorithm. The algorithm analyzes the information about the bottle, such as shipping history, contents and location, to predict whether fraud is likely. Thus, both the physical condition of the bottle, and the predictive capacity of the algorithm help detect fraud on the bottle.

19 Claims, 6 Drawing Sheets

(56) References Cited

U.S. PATENT DOCUMENTS

| | | | | |
|---|---|---|---|---|
| 2012/0242481 A1* | 9/2012 | Gernandt | ........... | G06K 19/0705 340/539.13 |
| 2013/0059534 A1* | 3/2013 | Sobalvarro | ............ | G06Q 30/02 455/41.1 |
| 2015/0145680 A1* | 5/2015 | Favier | ................. | E05B 73/0017 340/572.9 |
| 2015/0332355 A1* | 11/2015 | Kost | .................. | G06Q 30/0283 705/35 |

* cited by examiner

BOTTLE FRAUD DETECTION SYSTEM AND METHOD

FIELD OF THE INVENTION

The present invention relates generally to a bottle fraud detection system and method for detecting fraud of a bottle. More so, a bottle fraud detection system and method encapsulates a wireless communication tag into a bottle, and utilizes an algorithm to detect fraud and ensure the authenticity of a wine bottle.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

However, there are alternative wine closures are substitute closures used in the wine industry for sealing wine bottles in place of traditional cork closures. These synthetic corks are made from plastic compounds designed to look and "pop" like natural cork, but without the risk of TCA contamination The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon.

By way of educational background, another aspect of the prior art generally useful to be aware of is that wine and related types of beverages are most often packaged in glass bottles and depending on the kind or quality of the wine, the bottles are sealed with a cork. Some wines, e.g. Champagnes, are corked with stoppers having enlarged heads and which can be grasped and twisted. However the majority of red, white and rose wines are "corked" with stoppers made out of cork which is recessed in the neck of the bottle requiring some implement such as a corkscrew to extract the cork. Though there are other wines that are bottle packaged with "screw tops" and movement in this direction is obviously predicated to some extent on meeting consumer's demands for packaging which is easily opened without the necessity of additional equipment.

In many instances, wine fraud is a form of fraud in which the wine bottle is molested to change either the wine, or the bottle itself. The wines can be adulterated, usually with the addition of cheaper products such as juices and sometimes with the addition of harmful chemicals and sweeteners to compensate in color or flavor. Another form, is the substitution of labels, with cheap poor quality products sold under the labels of more expensive better wines. It is known that Federal governments and individual producers have taken many efforts in order to curb the prevalence of wine fraud. Some examples include marking bottles with engraved serial numbers on the glass and taking more control of the distribution process of their wines. Better documentation of the wine bottles can also help reduce wine fraud. However, for older vintages, the threat of fraud persists.

It is well known that a bottle stopper, especially for wine, is generally made from cork, which is an impermeable, buoyant material. Because of its impermeability, buoyancy, elasticity and fire retardant, cork is used in a variety of products, the most common of which is for wine stoppers. It is significant to note that both types of bottle stoppers may have other components and materials integrated therein.

Near-field communication (NFC) is a type of radio frequency communication technology, operating at about 13.56 MHz and at bandwidth of about 2 MHz, which allows for read-only and read-write communications between a NFC-enabled RF tag reader and a NFC-enabled tag. NFC operation is based on inductive coupling between two loop antennas, which allows for sharing of power and data between NFC-enabled devices.

Even though the above cited methods for detecting wine fraud address some of the needs of the market, a bottle fraud detection system and method that integrates a wireless communication device tag into a bottle cork, and then tracks and analyzes information from the tag to predict fraud is still desired.

SUMMARY OF THE INVENTION

The present invention is directed to a bottle fraud detection system and method that encapsulates a wireless communication tag into a bottle to help track the bottle and ensure the authenticity of the bottle. The tag stores information about the bottle. In one embodiment, the tag is physically integrated into a bottle stopper through encapsulation by multiple layers of a polymer film and a wax composition. The physical condition of the bottle stopper may serve as an indication of whether tampering has occurred to the tag. The information in the tag is accessible through a reading device, such as a scanner. The reading device communicates with a database that stores information about the bottle and analyzes the probability of fraud with an algorithm. The algorithm analyzes the information about the bottle, such as shipping history, contents, and location, to predict whether fraud is likely. In this manner, both the physical condition of the bottle, and the predictive capacity of the algorithm work in conjunction to help detect fraud on the bottle.

In one embodiment, the bottle is a wine bottle. The bottle stopper is a cork used to close off a bottle neck for storing wine in a wine bottle. In another embodiment, the wireless radio communications tag may include, without limitation, a near field communication (NFC) tag. The tag is restrained against the bottle stopper or general proximity of the bottle neck by multiple layers of fastening material. The information on the tag is accessed through a remote database. The information can be viewed by a user, and analyzed by an algorithm to detect fraud.

In some embodiments, the tag may be encapsulated on the bottle stopper with a thin polymer film that wraps around the tag and the bottle stopper. The polymer film can be heated to contract around the bottle stopper, consequently forming a snug fit around the bottle stopper and the tag. In this manner, the polymer film forms a smooth overlaying surface that securely integrates the tag with the bottle stopper. Thus, any attempt to access the tag by removing the thin polymer film is visibly apparent due to the nature of the polymer film to tear and form jagged edges when manipulated.

In some embodiments, a wax composition may be applied over the NFC tag. The wax composition serves to secure the tag onto the bottle stopper, and also prevents extraction of the liquid contents via a needle passed through the cork. The wax composition may include beeswax that covers the NFC tag. Thus, the beeswax is effective in providing a barrier against extraction of the liquid contents of the bottle via needle passed through the cork. Due to the wax layer being affixed to the top of the cork, removal of the layer is not possible within damaging the NFC tag.

In some embodiments, the tag may be used to store information about the contents of the bottle. In essence, the tag provide instant access to the information about the bottle, which may include, without limitation, a bottle content, a location history, a shipping route, a manufacturing date, manufacturer contact information, a price, a dietary information, and a website URL link. The information may be stored in a remote database, which can be accessed with the tag to review and verify the authenticity of the bottle. In one embodiment, the information in the tag can be accessed, viewed, and manipulated through a reading device, such as a smart phone.

Thus, the aforementioned tamper proof integration of the tag into the bottle stopper or bottle neck region may be efficacious for eliminating removal or modification of the tag. Consequently, fraud is prevented because removal of the tag requires removing the wax composition and the polymer film from the bottle stopper, thus creating a visibly obvious disfigurement of the bottle. However, the system and method is configured such that even if a fraudulent tag replaced an authentic tag the algorithmic security features provided by the system and method would be able to detect it as fraudulent.

The system utilizes a database for storing the information about the bottle. The database may also include an algorithm to organize and decipher the information about the bottle. The algorithm is efficacious for predicting the probability of fraud on the bottle since various parameter and variables of the bottle can be used to indicate fraud. In one embodiment, the algorithm may utilize predictive analytics to perform statistical techniques including modeling, machine learning, and data mining that analyze current and historical facts about the bottle, and similar bottles, to make predictions about future, or otherwise unknown, events. Thus, factors, such as present location, shipping history, and the type of wine in the bottle can be analyzed to calculate a probability of whether the particular bottle in question is authentic or counterfeit.

One objective of the present invention is to authenticate, as genuine or fraudulent, a wine contained in a bottle.

Another objective is to track suspicious movements of the bottle that may indicate fraud.

Another objective is to enable real time access to information pertinent to the bottle.

Another objective is to integrate an NFC tag into a cork, such that attempts to remove the NFC tag are visibly apparent.

Another objective is to integrate an NFC tag into the bottle without altering the bottle.

Yet another objective is to operatively connect the NFC tag with a remote database, such that a user can access the information from the database at any time with a simple reading device.

Yet another objective is to predict the probability of fraud with an algorithm that analyzes information about the bottle.

Yet another objective is to provide a simple fraud detection system and method that can be accessed over numerous platforms.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIGS. 2A and 2B illustrate top view of exemplary reading devices, where FIG. 2A illustrates an exemplary legitimate message, and FIG. 2B illustrates an exemplary fraudulent message, in accordance with an embodiment of the present invention;

FIGS. 3A, 3B, and 3C illustrate detailed perspective views of an exemplary tag integrated into an exemplary bottle stopper, where FIG. 3A illustrates the tag positioned above the bottle stopper, FIG. 3B illustrates a polymer film wrapped around the tag and a wax composition being applied over the polymer film and the tag, and FIG. 3C illustrates the wax composition and the polymer film overlaying the tag, in accordance with an embodiment of the present invention;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. §112.

In one embodiment of the present invention, presented in FIGS. 1-5, a bottle fraud detection system 100 and method 200 encapsulates a wireless communication tag 102 into a bottle 104 to help track the bottle 104 and ensure the authenticity of the bottle 104. The tag 102 stores information pertinent to the bottle 104. The information in the tag 102 is accessible through a reading device 112 for viewing, and analysis by an algorithm for predicting possible fraud on the bottle 104. The reading device 112 communicates with a database 114 that stores information about the bottle 104. The database 114 also includes an algorithm that helps predict the probability of fraud for the bottle 104.

Figure 3A:
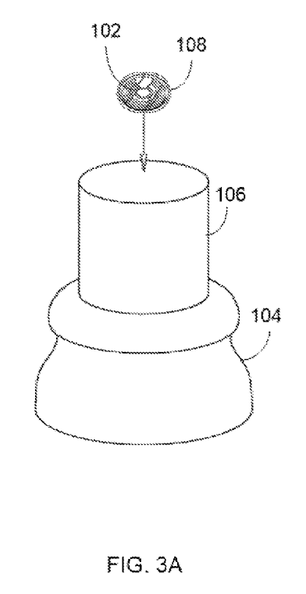
Figure 3B:
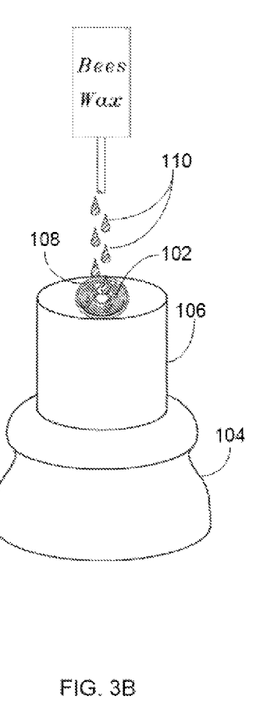
Figure 3C:
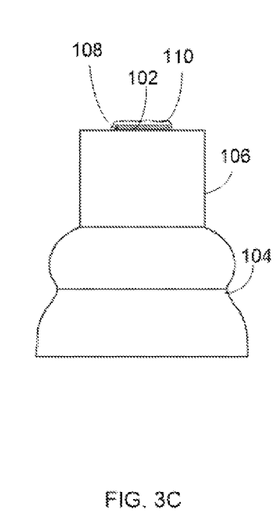

In one embodiment, the tag 102 is physically integrated into a bottle stopper 106 through encapsulation by multiple layers of a polymer film 108 and a wax composition 110. The physical condition and position of the bottle stopper 106, the polymer film 108 the wax composition 110, and the tag 102 serves as an indication of whether tampering has occurred to the bottle 104. The algorithm analyzes the information about the bottle 104, such as shipping history, contents, and location, to predict whether fraud is likely. In this manner, both the physical condition of the bottle 104, and the predictive capacity of the algorithm work in conjunction to help detect fraud on the bottle 104.

The bottle 104 may include a wine bottle. However, in other embodiments, the bottle 104 may contain any consumable contents, including, liquor, juice, jams or foods. In one possible embodiment, the bottle fraud detection system 100 and method 200 involves encapsulating a wireless communication tag 102, containing information pertinent to the bottle 104, into a bottle stopper 106 for tracking and ensuring the authenticity of the bottle 104. The system 100 and method 200 enables real time monitoring of a bottle 104 by integrating a wireless radio communication tag 102 into a bottle stopper 106, or general proximity of a bottle neck.

In one embodiment, the bottle stopper 106 is a cork on a wine bottle. However, in other embodiments, the bottle stopper 106 may include, without limitation, a screw cap, a crown cork, a rubber stopper, and a wax seal. In one embodiment, the wireless radio communications tag 102 may include, without limitation, a near field communication (NFC) tag. The tag 102 is restrained against the bottle stopper 106 or general proximity of the bottle 104 neck by multiple layers of fastening material. The information stored in the tag 102 is accessed through a reading device 112, which communicates with a database 114. In this manner, the information about the bottle can be viewed by a user, and analyzed by an algorithm to detect fraud.

Figure 1:
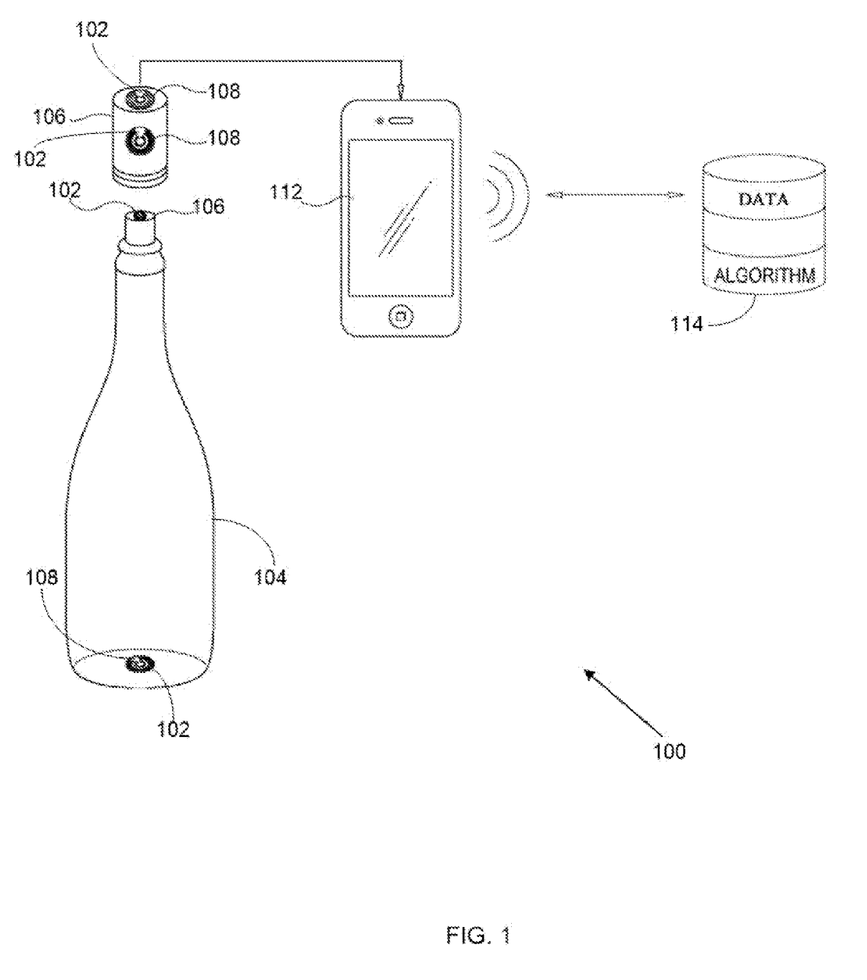
FIG. 1 illustrates a block diagram of an exemplary bottle fraud detection system, in accordance with an embodiment of the present invention.

FIG. 1 shows a bottle fraud detection system 100 that helps detect fraud for a bottle 104 by integrating a wireless communication tag 102 into a bottle stopper 106, or the general region of a bottle neck. However, in one alternative embodiment, the tag 102 may be integrated in the base of the bottle 104. In some embodiments, the wireless communication tag 102 may be encapsulated in the bottle stopper 106 with a thin polymer film 108 that wraps around the tag 102 and the bottle stopper 106. A wax composition 110 forms a secondary layer over the polymer film 108 and the tag 102. The polymer film 108 and the wax composition 110 integrate the tag 102 into the bottle stopper 106, such that tampering and other fraudulent acts are at least partially restricted.

In some embodiments, the tag 102 may be used to store information about the contents of the bottle 104. In essence, the tag 102 provide instant access to the information about the bottle 104. The information may include, without limitation, a bottle content, a location history, a shipping route, a manufacturing date, manufacturer contact information, a price, a dietary information, and a website URL link. The information may be stored in a remote database 114, which can be accessed through the reading device 112 to help review and verify the authenticity of the bottle 104.

Those skilled in the art, in light of the present teachings, will recognize that an NFC tag is a wireless technology which allows for the transfer of data such as text or numbers between two NFC enabled reading devices. Various sets of data types can be stored on the NFC tag. The actual amount of data varies depending on the type of NFC tag used, as different tag 102s have different memory capacities. For example, a standard Ultralight NFC tag can store a URL of around forty one characters, whereas an NTAG NFC tag can store a URL of around one hundred thirty two characters.

In one embodiment, the information in the tag 102 can be accessed, viewed, and manipulated through a reading device 112, such as a smart phone. In other embodiments, the reading device 112 may include, without limitation, a tablet, a computer, a scanner, and a server. Furthermore, the tag 102 may be scanned using standard off the shelf cellular phones having apps that can read the tag 102. The reading device 112 communicates with the database 114, which is configured to store, analyze, and return information about the bottle 104 and the probability of fraud. The database 114 stores the information about the bottle 104 for retrieval by the reading device 112. The database 114 may include an algorithm to analyze the information about the bottle 104. The algorithm is efficacious for predicting the probability of fraud on the bottle 104 since various parameter and variables of the bottle 104 can be used to indicate fraud. In one embodiment, the algorithm may utilize predictive analytics to perform statistical techniques including modeling, machine learning, and data mining that analyze current and historical facts about the bottle 104 to make predictions about future, or otherwise unknown, events.

Figure 2A:
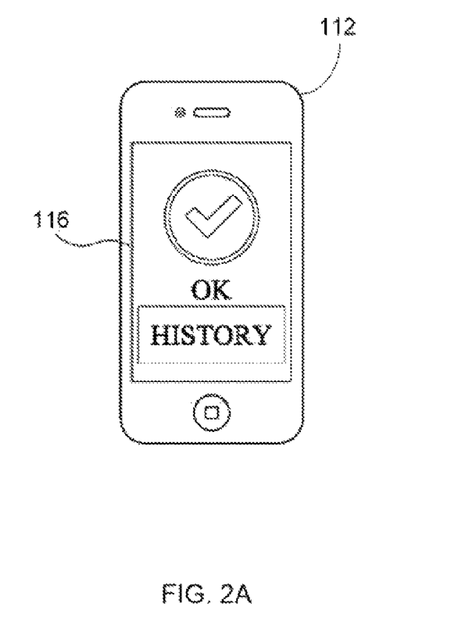
Figure 2B:
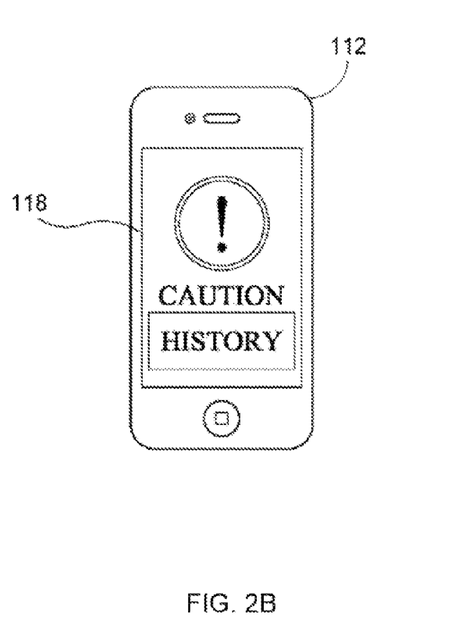

As referenced in FIGS. 2A and 2B, the reading device 112 displays messages for alerting about the status of the bottle 104, based on the analysis of the algorithm. In one embodiment, the reading device 112 displays a legitimate message 116 if the probability of a legitimate, untampered bottle 104 is great. However, if the algorithm predicts a tampered bottle 104 or bottle stopper 106, the reading device 112 displays a fraudulent message 118. In this manner, the authenticity of the bottle 104 may be quickly verified. The reading device 112 includes a display that presents the messages 116, 118 in an easy to view and understand colored, graphical format. This provides enhanced visual information. In some embodiments, the scanning of the tag 102 may be accomplished using a purpose built application, running the application on the smart phone, coupled with a cloud computing based warehouse and the algorithm for detecting the fraud. It is also significant to note that since the system 100 utilizes standard closures, no retooling of the bottling equipment would be required.

As referenced in FIG. 3A, the polymer film 108 wraps around the tag 102 in the general proximity of the bottle stopper 106 or bottle neck. However, in one alternative embodiment, the tag 102 may be integrated in the base, body, or neck regions of the bottle 104. In some embodiments, the polymer film 108 can be heated to contract around the bottle stopper 106, consequently forming a snug fit around the bottle stopper 106 and the tag 102. In one embodiment, the polymer film 108 comprises a thin film of polyolefin that is heated or shrink wrapped over the tag 102 and the bottle stopper 106 to form a tight fit. In this manner, the polymer film 108 forms a smooth overlaying surface that securely integrates the tag 102 with the bottle stopper 106. Thus, any attempt to access the tag 102 by removing the polymer film 108 is visibly apparent due to the nature of the polymer film 108 to tear and form jagged edges when manipulated.

Turning now to FIG. 3B, a wax composition 110 is applied over the tag 102. The wax composition 110 provides a layer of wax that serves to secure the tag 102 onto the bottle stopper 106, and also prevents extraction of the liquid contents via a needle passed through the bottle stopper 106. This is especially problematic due to the soft characteristics of cork. The wax composition 110 may include beeswax that covers the tag 102. Thus, the beeswax is effective in providing a barrier against extraction of the liquid contents of the bottle 104 via needle passed through the bottle stopper 106. Due to the wax composition 110 being affixed to the top of the bottle stopper 106, removal of the wax composition 110 is not possible within damaging the tag 102 (FIG. 3C).

Thus, the aforementioned tamper proof integration of the tag 102 into the bottle stopper 106 or bottle neck region may be efficacious for eliminating removal or modification of the tag 102. Consequently, fraud is prevented because removal of the tag 102 requires removing the wax composition 110 and the polymer film 108 from the bottle stopper 106, thus creating a visibly obvious disfigurement of the bottle 104. However, the system 100 and method 200 is configured such that even if a fraudulent tag 102 replaced an authentic tag 102, accessing the database 114 would not be possible, due to algorithmic security features provided by the system 100 and method 200.

For example, by applying these data analytics across the entire data set of bottle 104 movements through the supply/retail chain, it is possible to develop metrics that would identify which vintages of wine are more likely to be counterfeited. Thus, factors, such as present location, shipping history, and the type of wine in the bottle 104 can be analyzed to calculate a probability of whether the wine is authentic or counterfeit. In another example, the shipping history and location of the bottle 104 can indicate fraud. If an NFC tag on a unique wine bottle 104 tag 102 is scanned in New York, and then the same bottle 104 appears to be scanned again in Los Angeles within an hour, it could be concluded that one of the two scanned bottles was a counterfeit (using a cloned tag) due to the low probability of shipping the bottle 104 between those two cities in such a short time frame.

Yet another example of the algorithm detecting fraud could be the large number of French wine bottles detected in California. While French wine is sold in California, the odds of thousands of French wine bottles appearing in California in a short span of time could raise red flags in the algorithm, as this may indicate that tags 102 are being removed from the wine bottles and collected from sold or consumed wine bottles for reuse. Additional anti-fraud measures provided by the system 100 may involve monitoring the bottle's 104 prior movement from a retail seller, to a private buyer, and back to a retail seller. In this example, this pattern of movement is possible, but the algorithm would still provide a fraudulent message 118 to alert the consumer or collector. The fraudulent message 118 enables further investigation and questioning about the authenticity of the bottle 104 prior to making a purchase.

Figure 4A:
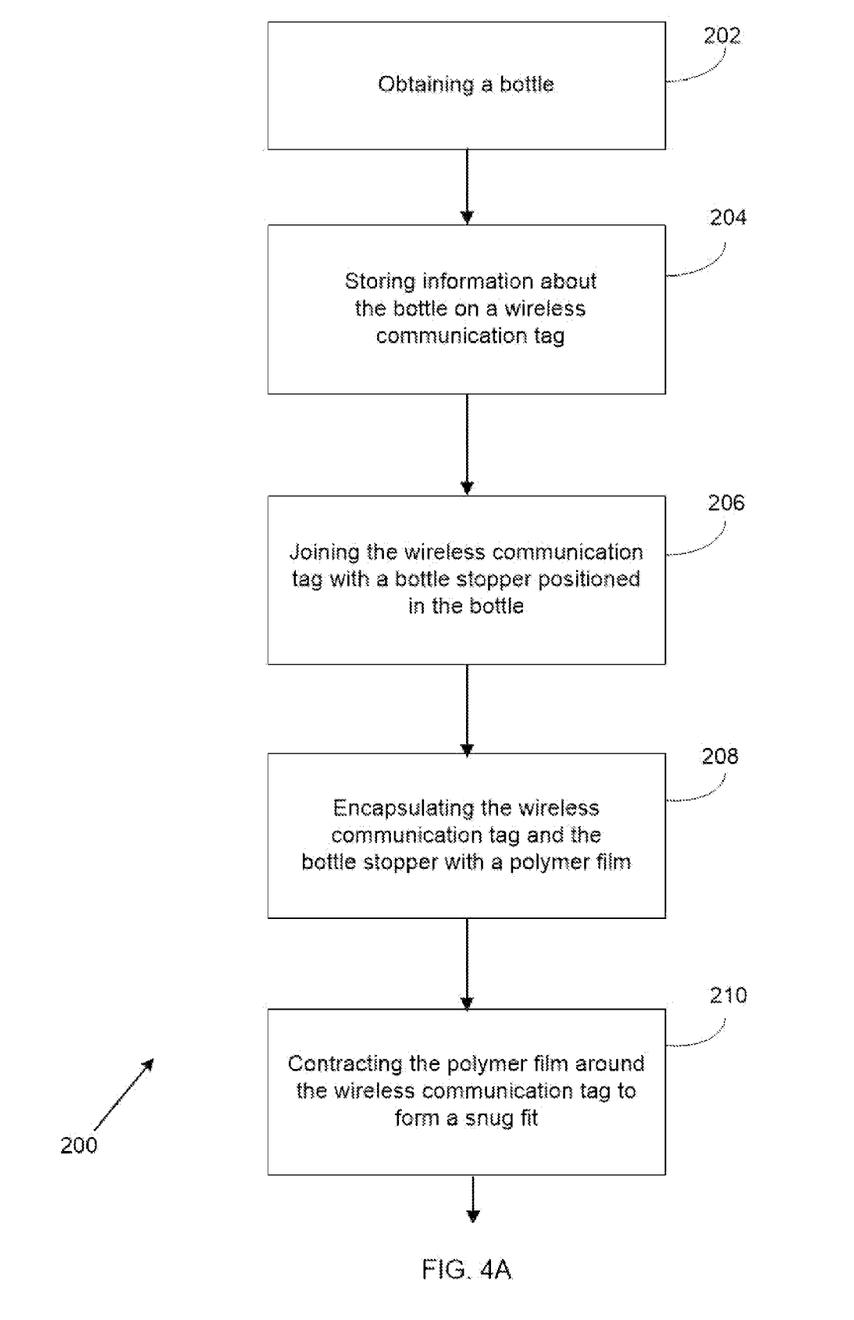
FIGS. 4A and 4B illustrate a flow chart diagram of an exemplary bottle fraud detection method, in accordance with an embodiment of the present invention.
Figure 4B:
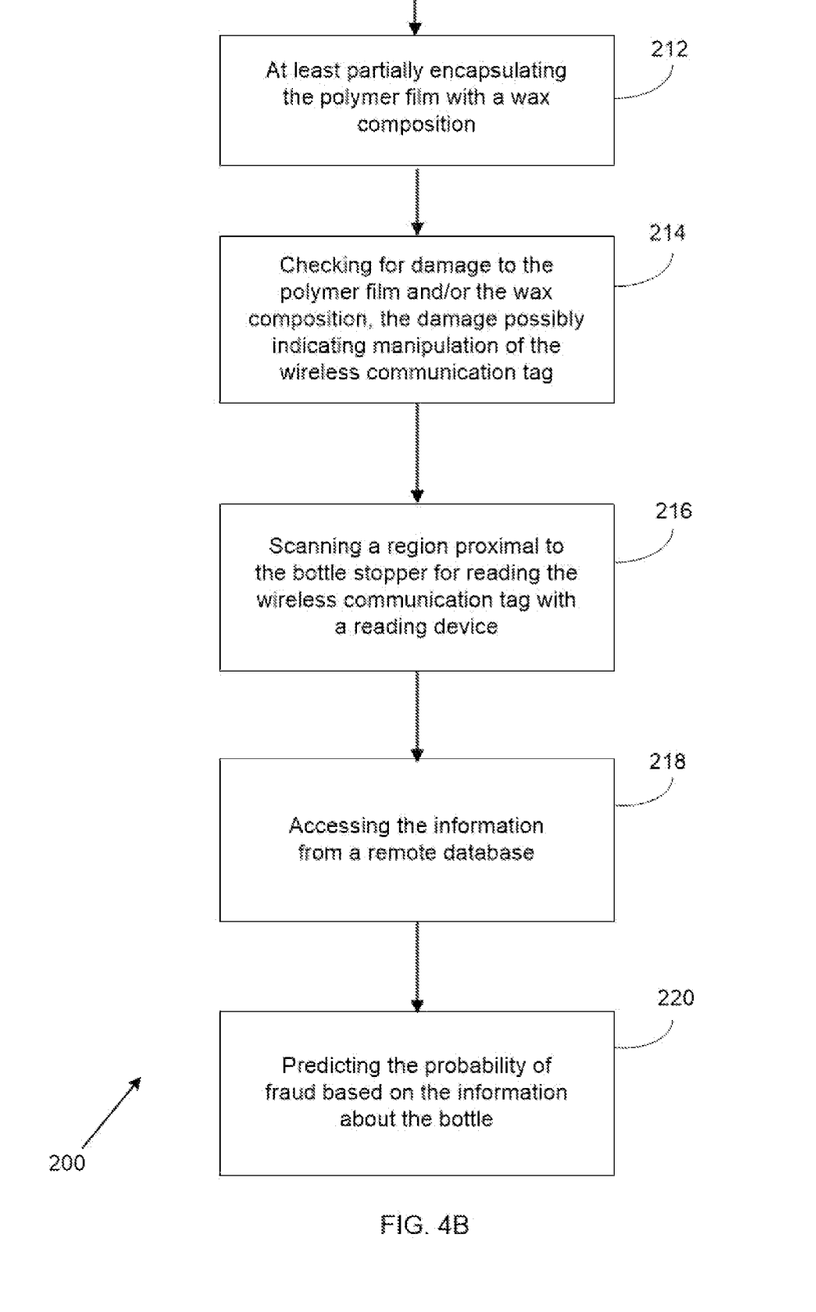

FIGS. 4A and 4B illustrate a flowchart diagram of an exemplary method 200 for detecting fraud for a bottle 104. The method 200 encapsulates a wireless communication tag 102 into a bottle 104 to help track the bottle 104 and ensure the authenticity of the bottle 104. The tag 102 stores information pertinent to the bottle 104. The information is accessible through a reading device 112 for viewing, and analysis by an algorithm for predicting possible fraud on the bottle 104. The method 200 may include an initial Step 202 of obtaining a bottle 104. The bottle 104 may include a wine bottle. Those skilled in the art, in light of the present teachings, will recognize that wine fraud tampering of the bottle 104 to change either the wine, or the bottle 104 itself. The wines can be adulterated, usually with the addition of cheaper products.

The method 200 may further comprise a Step 204 of storing information about the bottle 104 on a wireless communication tag 102. The tag 102 may be used to store information about the contents of the bottle 104. In essence, the tag 102 provide instant access to the information about the bottle 104. The information may include, without limitation, a bottle 104 content, a location history, a shipping route, a manufacturing date, manufacturer contact information, a price, a dietary information, and a website URL link. The information may be stored in a remote database 114, which can be accessed through the tag 102 to review and verify the authenticity of the bottle 104.

A Step 206 includes joining the wireless communication tag 102 with a bottle stopper 106 positioned in the bottle 104. A polymer film 108 wraps around the tag 102 in the general proximity of the bottle stopper 106 or bottle neck. In some embodiments, a Step 208 comprises encapsulating the wireless communication tag 102 and the bottle stopper 106 with a polymer film 108. A Step 210 includes contracting the polymer film 108 around the wireless communication tag 102 to form a snug fit. The polymer film 108 integrates the tag 102 into the bottle stopper 106 or bottle neck. The polymer film 108 can be heated to contract around the bottle stopper 106, consequently forming a snug fit around the bottle stopper 106 and the tag 102.

In some embodiments, a Step 212 may include at least partially encapsulating the polymer film 108 with a wax composition 110. The wax composition 110 is applied over the polymer film 108 to create a second layer of security for the tag 102. The wax composition 110 serves to secure the tag 102 onto the bottle stopper 106, and also protects the polymer film 108 from physical damage or undesirable removal of the tag 102. A Step 214 comprises checking for damage to the polymer film 108 and/or the wax composition 110, wherein the damage possibly indicates manipulation of the wireless communication tag 102. Fraud is prevented because removal of the tag 102 requires removing the wax composition 110 and the polymer film 108 from the bottle stopper 106, thus creating a visibly obvious disfigurement of the bottle 104. In some embodiments, a Step 216 may include scanning a region proximal to the bottle stopper 106 for reading the wireless communication tag 102 with a reading device 112, such as a smart phone having a scanning app. In one embodiment, the information in the tag 102 can be accessed, viewed, and manipulated through a reading device 112, such as a smart phone.

A Step 218 comprises accessing the information from a remote database 114. A database 114 for storing the information about the bottle 104. The reading device 112 communicates with a database 114 to retrieve information. The database 114 also contains an algorithm for predicting the probability of fraud and operating other manipulations for the method 200. A final Step 220 includes predicting the probability of fraud based on the information about the bottle 104. The database 114 may also include an algorithm to analyze the information about the bottle 104. The algorithm is efficacious for predicting the probability of fraud on the bottle 104 since various parameter and variables of the bottle 104 can be used to indicate fraud. In one embodiment, the algorithm may utilize predictive analytics to perform statistical techniques including modeling, machine learning, and data mining that analyze current and historical facts about the bottle 104 to make predictions about future, or otherwise unknown, events.

Figure 5:
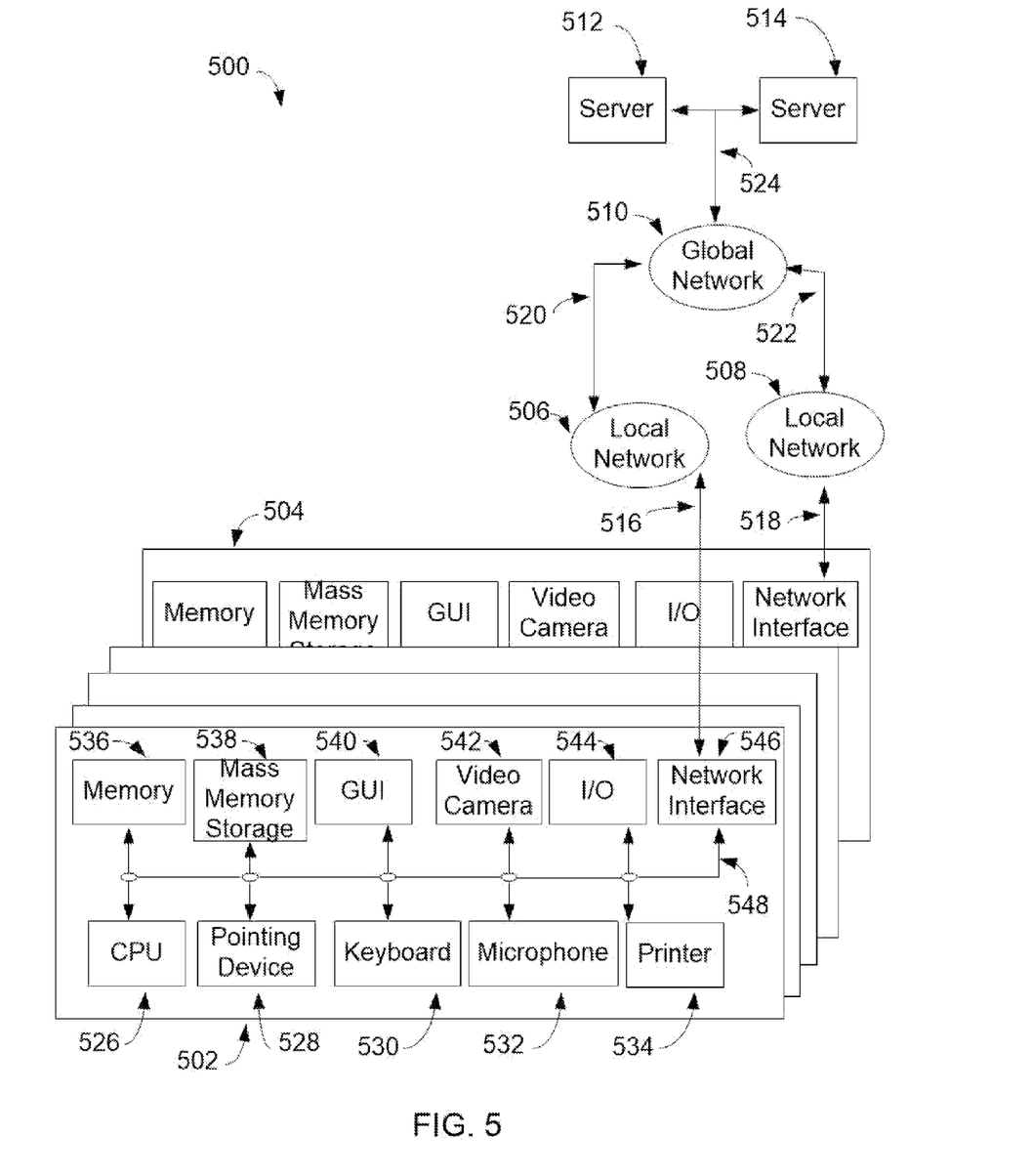
FIG. 5 illustrates a block diagram depicting an exemplary client/server system which may be used by an exemplary web-enabled/networked embodiment, in accordance with an embodiment of the present invention.

FIG. 5 is a block diagram depicting an exemplary client/server system which may be used by an exemplary web-enabled/networked embodiment of the present invention. In the present invention, a communication system 500 includes a multiplicity of clients with a sampling of clients denoted as a client 502 and a client 504, a multiplicity of local networks with a sampling of networks denoted as a local network 506 and a local network 508, a global network 510 and a multiplicity of servers with a sampling of servers denoted as a server 512 and a server 514.

Client 502 may communicate bi-directionally with local network 506 via a communication channel 516. Client 504 may communicate bi-directionally with local network 508 via a communication channel 518. Local network 506 may communicate bi-directionally with global network 510 via a communication channel 520. Local network 508 may communicate bi-directionally with global network 510 via a communication channel 522. Global network 510 may communicate bi-directionally with server 512 and server 514 via a communication channel 524. Server 512 and server 514 may communicate bi-directionally with each other via communication channel 524. Furthermore, clients 502, 504, local networks 506, 508, global network 510 and servers 512, 514 may each communicate bi-directionally with each other.

In one embodiment, global network 510 may operate as the Internet. It will be understood by those skilled in the art that communication system 500 may take many different forms. Non-limiting examples of forms for communication system 500 include local area networks (LANs), wide area networks (WANs), wired telephone networks, wireless networks, or any other network supporting data communication between respective entities.

Clients 502 and 504 may take many different forms. Non-limiting examples of clients 502 and 504 include personal computers, personal digital assistants (PDAs), cellular phones and smartphones.

Client 502 includes a CPU 526, a pointing device 528, a keyboard 530, a microphone 532, a printer 534, a memory 536, a mass memory storage 538, a GUI 540, a video camera 542, an input/output interface 544 and a network interface 546.

CPU 526, pointing device 528, keyboard 530, microphone 532, printer 534, memory 536, mass memory storage 538, GUI 540, video camera 542, input/output interface 544 and network interface 546 may communicate in a unidirectional manner or a bi-directional manner with each other via a communication channel 548. Communication channel 548 may be configured as a single communication channel or a multiplicity of communication channels.

CPU 526 may be comprised of a single processor or multiple processors. CPU 526 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 536 is used typically to transfer data and instructions to CPU 526 in a bi-directional manner. Memory 536, as discussed previously, may include any suitable computer-readable media, intended for data storage, such as those described above excluding any wired or wireless transmissions unless specifically noted. Mass memory storage 538 may also be coupled bi-directionally to CPU 526 and provides additional data storage capacity and may include any of the computer-readable media described above. Mass memory storage 538 may be used to store programs, data and the like and is typically a secondary storage medium such as a hard disk. It will be appreciated that the information retained within mass memory storage 538, may, in appropriate cases, be incorporated in standard fashion as part of memory 536 as virtual memory.

CPU 526 may be coupled to GUI 540. GUI 540 enables a user to view the operation of computer operating system and software. CPU 526 may be coupled to pointing device 528. Non-limiting examples of pointing device 528 include computer mouse, trackball and touchpad. Pointing device 528 enables a user with the capability to maneuver a computer cursor about the viewing area of GUI 540 and select areas or features in the viewing area of GUI 540. CPU 526 may be coupled to keyboard 530. Keyboard 530 enables a user with the capability to input alphanumeric textual information to CPU 526. CPU 526 may be coupled to microphone 532. Microphone 532 enables audio produced by a user to be recorded, processed and communicated by CPU 526. CPU 526 may be connected to printer 534. Printer 534 enables a user with the capability to print information to a sheet of paper. CPU 526 may be connected to video camera 542. Video camera 542 enables video produced or captured by user to be recorded, processed and communicated by CPU 526.

CPU 526 may also be coupled to input/output interface 544 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 526 optionally may be coupled to network interface 546 which enables communication with an external device such as a database or a computer or telecommunications or internet network using an external connection shown generally as communication channel 516, which may be implemented as a hardwired or wireless communications link using suitable conventional technologies. With such a connection, CPU 526 might receive information from the network, or might output information to a network in the course of performing the method steps described in the teachings of the present invention.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. A system for detecting fraud for a bottle, the system comprises:
a wireless communication tag configured to contain information about a bottle;
a polymer film configured to encapsulate the wireless communication tag onto a bottle stopper;
a wax composition configured to at least partially encapsulate the wireless communication tag, wherein manipulation of the wireless communication tag at least partially damages the polymer film and/or the wax composition;

a reading device configured to scan the wireless communication tag for accessing the information about the bottle; and a database containing information related to a probability of fraud based on the information about the bottle;

an algorithm, wherein the algorithm executes on a processor that is in communication with the wireless communication tag via a wireless protocol and, after exchanging data with the wireless communication tag, the processor executes the algorithm and determines the probability of fraud.

2. The system of claim 1, wherein the bottle comprises a wine bottle.

3. The system of claim 2, wherein the bottle stopper comprises a cork.

4. The system of claim 3, wherein the wireless communication tag comprises a near field communication tag.

5. The system of claim 4, wherein the polymer film comprises a film of polyolefin.

6. The system of claim 5, wherein the polymer film is heated for contracting around the bottle stopper and the wireless communication tag.

7. The system of claim 6, wherein the wax composition comprises beeswax.

8. The system of claim 7, wherein the polymer film and the wax composition are configured to be at least partially damaged when the wireless communication tag is physically manipulated.

9. The system of claim 8, wherein the reading device comprises a smart phone.

10. The system of claim 9, wherein the information about the bottle comprises at least one of the following: a location history, a shipping route, a bottle content, a manufacturing date, manufacturer contact information, a price, a dietary information, and a website URL link.

11. The system of claim 10, wherein the information about the bottle is accessed from a remote database through the wireless communication tag.

12. The system of claim 11, wherein the wireless communication tag is disposed on a base region of the bottle.

13. The system of claim 12, wherein a second wireless communication tag is disposed on the bottle.

14. A system for detecting fraud for a wine bottle, the system comprises:

a near field communication tag configured to contain information about a wine bottle;

a polymer film configured to encapsulate the near field communication tag onto a bottle cork;

a wax composition configured to at least partially encapsulate the near field communication tag, wherein manipulation of the near field communication tag at least partially damages the polymer film and/or the wax composition;

a reading device configured to scan the near field communication tag for accessing the information about the wine bottle;

a database containing information related to a probability of fraud based on the information about the bottle;

an algorithm, wherein the algorithm executes on a processor that is in communication with the near field communication tag via a wireless protocol and, after exchanging data with the near field communication tag, the processor executes the algorithm and determines the probability of fraud.

15. The system of claim 14, wherein the polymer film is heated for contracting around the bottle cork and the near field communication tag.

16. The system of claim 15, wherein the polymer film and the wax composition are configured to be at least partially damaged when the near field communication tag is manipulated.

17. The system of claim 16, wherein the information about the wine bottle comprises at least one of the following: a location history, a shipping mute, a wine bottle content, a manufacturing date, manufacturer contact information, a price, a dietary information, and a website URL link.

18. The system of claim 17, wherein the information about the wine bottle is accessed from a remote database through the near field communication tag.

19. One or more non-transitory computer storage media storing computer-usable instructions, that when used by one or more computing devices, cause the one or more computing devices to perform a method for detecting fraud for a wine bottle, the method comprising:

obtaining a bottle;

storing information about the bottle on a wireless communication tag;

joining the wireless communication tag with a bottle stopper positioned in the bottle;

encapsulating the wireless communication tag and the bottle stopper with a polymer film;

contracting the polymer film around the wireless communication tag to form a snug fit;

at least partially encapsulating the wireless communication tag with a wax composition;

checking for damage to the polymer film and/or the wax composition, the damage possibly indicating manipulation of the wireless communication tag;

scanning a region proximal to the bottle stopper for reading the wireless communication tag with a reading device;

accessing the information from a remote database; and predicting a probability of fraud based on the information about the bottle; wherein the step of predicting the probability of fraud comprises inspecting the wireless communication tag and analyzing the information about the bottle with an algorithm; wherein the algorithm executes on a processor that is in communication with the tag via a wireless protocol and, after exchanging data with the tag, the processor executes the algorithm and determines the probability of fraud.

* * * * *